United States Patent
Kupnik et al.

(10) Patent No.: US 6,768,373 B2
(45) Date of Patent: Jul. 27, 2004

(54) CIRCUIT CONFIGURATION FOR DEMODULATING A VOLTAGE WHICH IS ASK MODULATED BY ALTERING THE AMPLITUDE BETWEEN A LOW LEVEL AND A HIGH LEVEL

(75) Inventors: Mario Kupnik, Leoben (AT); Gebhard Melcher, Weinitzen (AT); Tobias Schlager, Kumberg (AT); Walter Kargl, Graz (AT); Ernst Neuhold, Hausmannstätt (AT)

(73) Assignee: Infienon Technologies AG, Munich (DE)

( * ) Notice: Subject to any disclaimer, the term of this patent is extended or adjusted under 35 U.S.C. 154(b) by 0 days.

(21) Appl. No.: 10/680,384

(22) Filed: Oct. 6, 2003

(65) Prior Publication Data

US 2004/0066227 A1 Apr. 8, 2004

Related U.S. Application Data

(63) Continuation of application No. PCT/DE02/00668, filed on Feb. 22, 2002.

(30) Foreign Application Priority Data

Apr. 4, 2001 (DE) .......................................... 101 16 747
Apr. 4, 2001 (DE) .......................................... 101 16 874

(51) Int. Cl.$^7$ ............................ H03D 1/00; H03D 1/02; H04L 27/06
(52) U.S. Cl. ........................................ 329/311; 375/340
(58) Field of Search ................................. 329/311, 347; 375/320, 340, 353; 455/337

(56) References Cited

U.S. PATENT DOCUMENTS 6,307,428 B1 * 10/2001 Nebel et al. ................ 329/311
6,323,728 B1   11/2001 Schmitt-Landsiedel et al.

FOREIGN PATENT DOCUMENTS

EP   0 940 769 A1   9/1999
FR   2 751 148      1/1998

* cited by examiner

*Primary Examiner*—David Mis
(74) *Attorney, Agent, or Firm*—Laurence A. Greenberg; Werner H. Stemer; Ralph E. Locher

(57) ABSTRACT

The invention provides a circuit configuration for demodulating a voltage that is ASK modulated by altering the amplitude between a low level and a high level. In this case, a first and a second charging circuit each produce a charging voltage and decoupling device decouples the first charging circuit when there is a prescribed ratio between the charging voltage of the second charging circuit and an input voltage for the rectifier circuit.

7 Claims, 5 Drawing Sheets

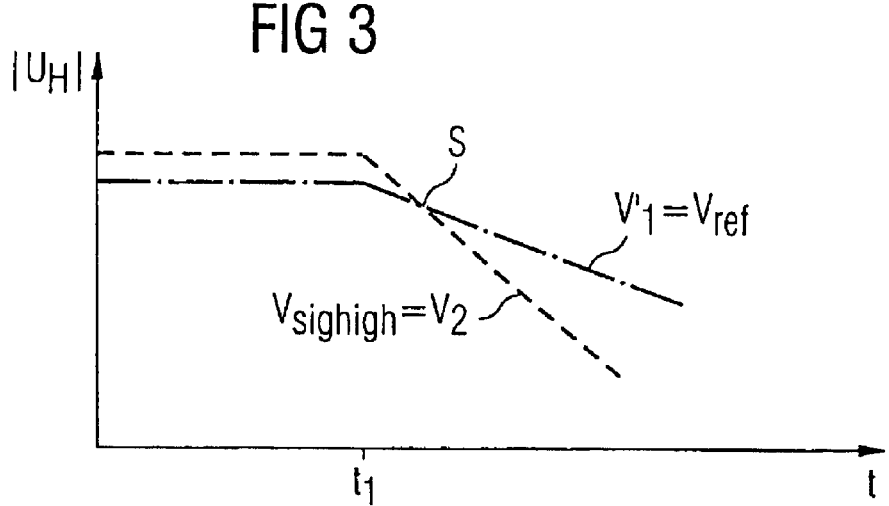
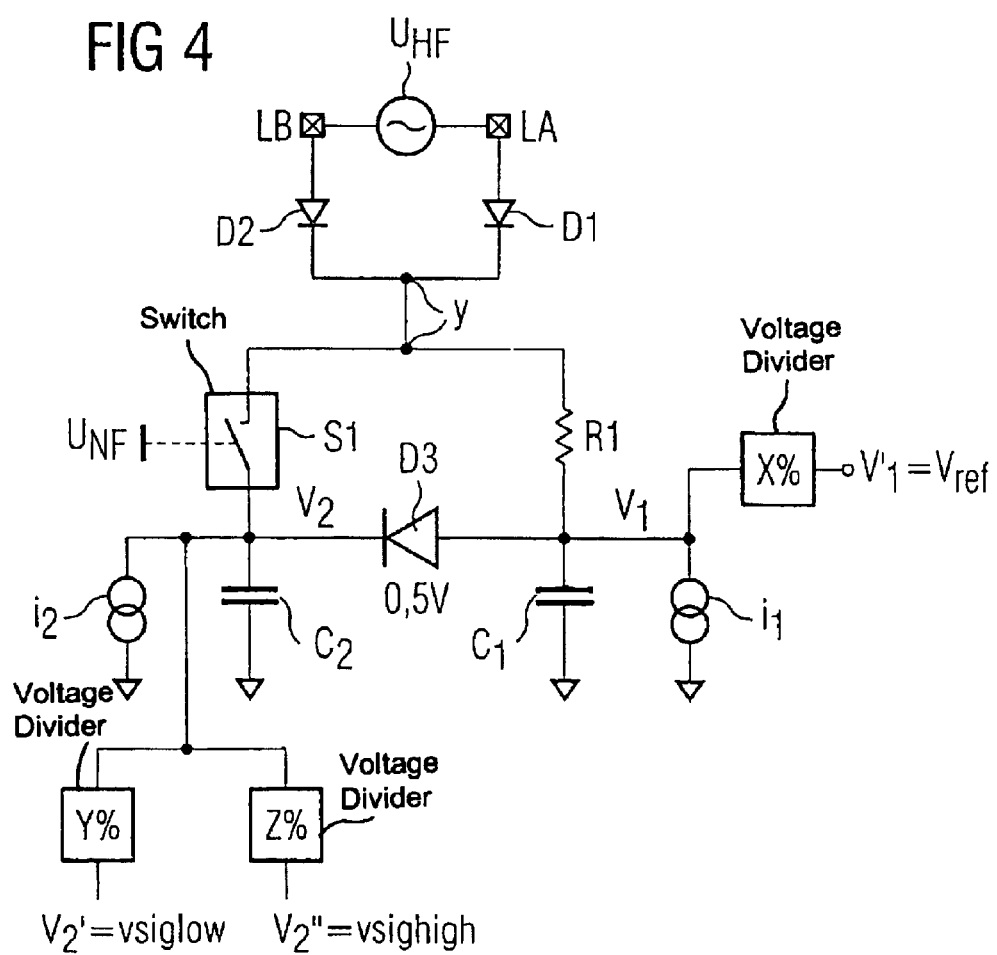

CIRCUIT CONFIGURATION FOR DEMODULATING A VOLTAGE WHICH IS ASK MODULATED BY ALTERING THE AMPLITUDE BETWEEN A LOW LEVEL AND A HIGH LEVEL

CROSS-REFERENCE TO RELATED APPLICATION

This application is a continuation of International application PCT/DE02/00668, filed Feb. 22, 2002, which designated the United States, and which was not published in English.

BACKGROUND OF THE INVENTION

Field of the Invention

The invention relates to a circuit configuration for demodulating a voltage that is ASK (amplitude-shift keying) modulated by altering the amplitudes between a low level and a high level.

When using contactless chip cards and the like, such as "contactless tags", "ASK modulation" is often used. This is understood to mean a high-frequency signal that alternates between a first level and a second level using data available in digital form, and thus modulates the high-frequency signal.

In the same way as a distinction is drawn between "yes" and "no" or "1" and "0" or "high" and "low" for digital data, a distinction is drawn between a high amplitude and a low amplitude. In this context, two modulation types ASK 100 and ASK 10 are currently the norm. Modulation type ASK 100 signifies a level difference of 100% and ASK 10 signifies a level difference of 10%. Other differences are also possible, however, and the invention described below is not restricted to these two customary modulation types.

The problem with ASK modulation is that when the distance between the sender and the receiver of a signal being modulated in this way changes while the amplitude of the transmitted signal is constant, the received amplitude at the receiver changes. The same applies if differences arise in the intervening space between the sender and the receiver.

To make matters worse, when using signals which always return to "zero" (i.e. the signal returns to "zero" between two binary "ones"), and signals which do not always return to zero, the "0" and "1" sequences that are modulated and transferred are of different lengths.

SUMMARY OF THE INVENTION

It is accordingly an object of the invention to provide a circuit configuration for demodulating a modulated voltage having an amplitude alternating between a low level and a high level, which overcomes the above-mentioned disadvantages of the prior art apparatus of this general type.

In particular, the object of the invention is to provide a demodulator circuit, which reliably identifies the level change between two states during ASK modulation operations, and which has as little complexity as possible.

With the foregoing and other objects in view there is provided, in accordance with the invention, a circuit configuration for demodulating a modulated voltage having an amplitude alternating between a low level and a high level. The circuit configuration includes a high-frequency input, and a rectifier circuit connected downstream of the high-frequency input. The rectifier circuit has an output and an input for obtaining an input voltage. The circuit configuration also includes a first charging circuit for producing a charging voltage and a second charging circuit for producing a charging voltage. The first charging circuit and the second charging circuit are connected in parallel to the output of the rectifier circuit. The circuit configuration also includes a decoupling device for decoupling the charging voltage of the first charging circuit and the charging voltage of the second charging circuit when there is a prescribed ratio between the respective charging voltage and the input voltage for the rectifier circuit. The circuit configuration also includes an evaluation circuit for ascertaining a modulation level from the ratio of the charging voltages.

The specified circuit has the advantage that it is a simple matter to identify the change in the modulation level when comparing the two charging voltages.

In accordance with an added feature of the invention, there is provided a floating current-mirror circuit for the first charging circuit and the second charging circuit.

In accordance with an additional feature of the invention, there is provided a voltage transformer for changing the charging voltage of the first charging circuit and/or the is charging voltage of the second charging circuit.

In accordance with another feature of the invention, there is provided a diode for coupling the first charging circuit and the second charging circuit when there is a predetermined ratio between the charging voltage of the first charging circuit and the charging voltage of the second charging circuit.

In accordance with a further feature of the invention, a voltage on the second charging circuit is converted into two different voltages.

In accordance with a further added feature of the invention, the first charging circuit and the second charging circuit have different discharge times.

In accordance with a further additional feature of the invention, there is provided a charging-current amplification circuit and a changeover apparatus for turning on the charging-current amplification circuit from a prescribed degree of modulation onwards.

Other features which are considered as characteristic for the invention are set forth in the appended claims.

Although the invention is illustrated and described herein as embodied in circuit configuration for demodulating a voltage which is ASK modulated by altering the amplitude between a low level and a high level, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a graph of illustrative curves for the first and second charging voltages;

FIG. 4 is a diagram of a second exemplary embodiment of the circuit configuration;

DESCRIPTION OF THE PREFERRED EMBODIMENTS

Figure 1:
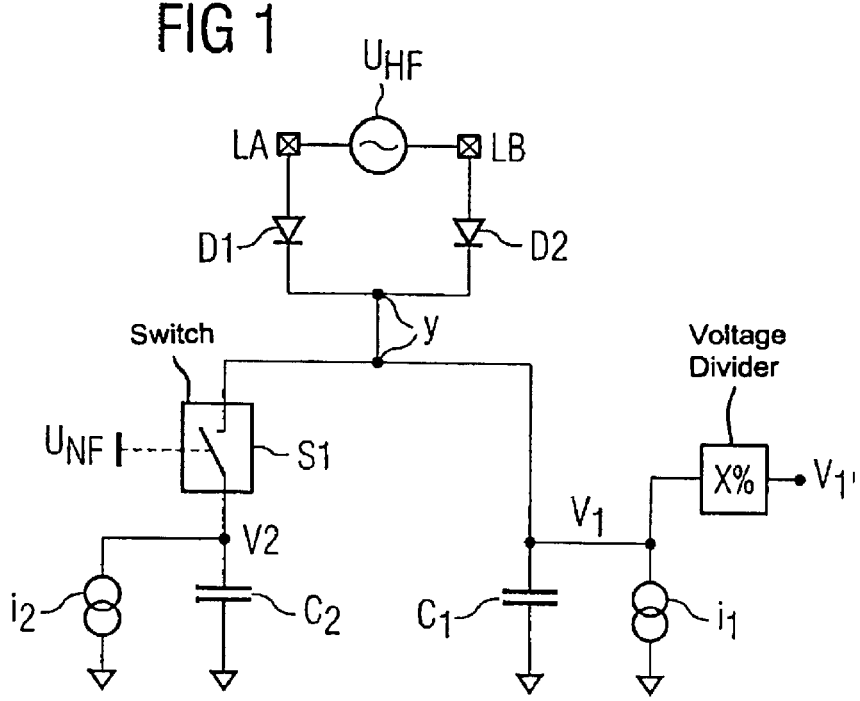
FIG. 1 is a diagram of a first exemplary embodiment of an inventive circuit configuration.
Figure 2:
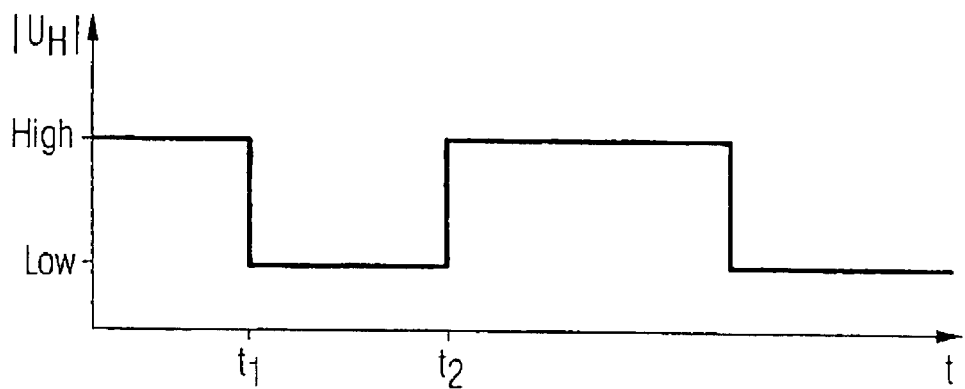
FIG. 2 is a graph of the envelope for an ASK modulated signal.

Referring now to the figures of the drawing in detail and first, particularly, to FIG. 1 thereof, there is shown a first inventive exemplary embodiment of the invention, specifically a demodulator circuit, in which a high-frequency input voltage $U_{HF}$ is applied to the input of the demodulator circuit. The input is denoted by the two input connections LA and LB. FIG. 2 shows the envelope for the amplitude value of the high-frequency input voltage over time. As can be seen, it alternates between a high amplitude level, denoted by "high" and a low amplitude level, denoted by "low". This rectified high-frequency input voltage $U_{HF}$ is thus present in rectified form on the node Y shown in FIG. 1. The node Y has two charging circuits connected to it in parallel, which are is charged by the rectified high-frequency voltage.

The first charging circuit includes the capacitor C1 and a current source $i_1$, which are connected in parallel from the voltage node V1. Correspondingly, the second charging circuit includes the capacitor C2 and the current source $i_2$, which are connected in parallel from the current node V2. The second charging circuit is connected to the node Y via a charging switch S1. This switch S1 is actuated with the low-frequency voltage $U_{NF}$ used to modulate the high-frequency AC voltage $U_{HF}$. This is made possible in an extremely simple manner using a diode (not shown).

The way in which this circuit works is explained below. While the rectified high-frequency voltage $U_{HF}$ on the node Y is greater than the voltage on the input nodes V1 and V2 of the charging circuits, and the switch S1 is on, the capacitors C1 and C2 are charged to the value of the rectified high-frequency AC voltage $U_{HF}$.

At the same time, the capacitors C1 and C2 are discharged by the current sources $i_1$ and $i_2$, the time constant of the two charging circuits can be chosen such that it is high with respect to half the period of the high-frequency input voltage $U_{HF}$ 80 that the two input nodes V1 and V2 of the charging circuits experience no substantial voltage fluctuation (hum) caused by the zero crossings of the high-frequency AC voltage.

As FIG. 2 shows, the amplitude of the high-frequency input voltage $U_{HF}$ is now intended to be at the "high" level up until the time before t1. At the time t1, it changes over to the "low" level. The result of this change is that the switch S1 turns off and the second charging circuit, and hence the input node V2, is decoupled from the rest of the circuit. If the time constants of the first and second charging circuits are chosen to be different, the two capacitors C1 and C2 discharge differently. This is possible, by way of example, by choosing the two capacitors C1 and C2 to be of the same size, whereas the current sources $i_1$ and $i_2$ are chosen to have different strengths. The resultant discharge behavior is shown in FIG. 3.

As can be seen in FIG. 3, the voltage on the node V2 drops much more sharply than the voltage on the node V1. As can be seen in FIG. 1, the voltage V1 is again converted to a voltage at V1' by using a voltage divider X%. As can be seen in FIG. 3, this causes the discharge curves V2 and V1' to intersect. The point of intersection S is now suitable for identifying the passage from the "high" level to the "low" level. An evaluation circuit {described later} can be used to detect such a point of intersection.

FIG. 4 shows another form of the inventive demodulator circuit. In this case, reference will first be made to the two voltage dividers Y% and Z% which convert the voltage on the node V2 into two different voltages V2' (also referred to as "$V_{siglow}$") and V2" (also referred to as "$V_{sighigh}$").

The circuit shown in FIG. 4 works, in principle, in exactly the same way as the circuit described with reference to FIG. 1. In this case, the time constant of the second charging circuit needs to be much lower than that of the first charging circuit, i.e. the current source $i_2$ discharges the capacitor C2 much faster than the current source $i_1$ on the capacitor C1.

Figure 6:
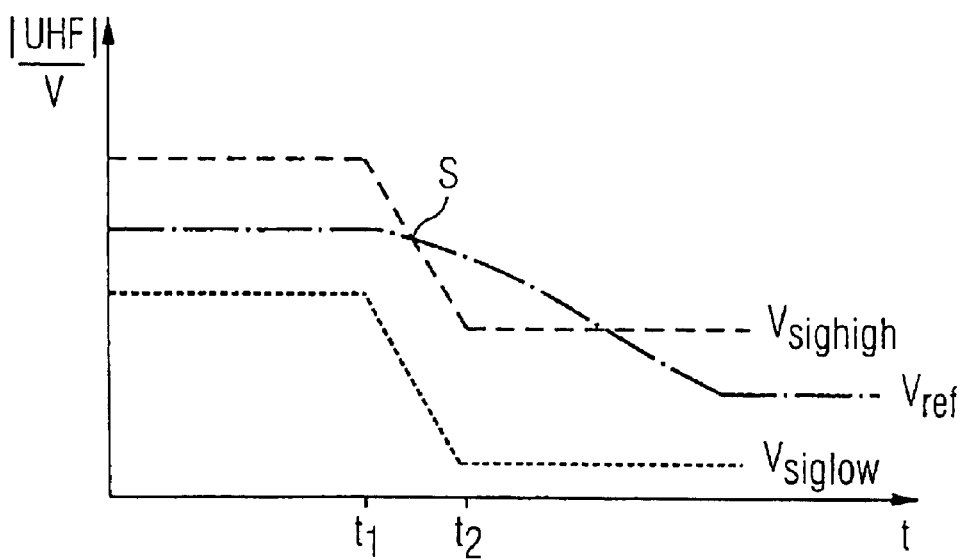
FIG. 6 is a graph of a characteristic discharge curve for Vref.

This can be seen clearly in FIG. 6. The signals $V_{sighigh}$ and $V_{siglow}$ thus follow the level change in the high-frequency input voltage from "high" to "low" fairly accurately. As has also already been described in FIG. 3 with reference to FIG. 1, the point of intersection S is produced between the signal $V_{ref}$ and a signal that corresponds to the voltage signal $V_{sighigh}$.

Figure 8:
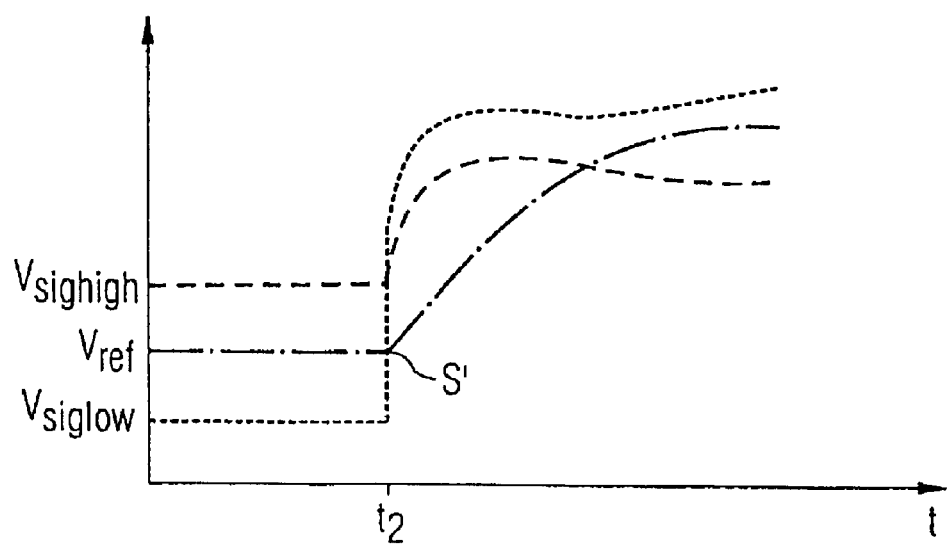
FIG. 8 is a graph of a characteristic charging curve for Vref.

As soon as the discharge by way of the current source $i_2$ has caused the voltage on the voltage node V2 to fall to the extent that the voltage is below the high-frequency input voltage $U_{HF}$, the switch S1 turns on again. This means that the current source $i_2$ now additionally discharges the capacitor C1 via the resistor R1. This can be identified from the fact that the discharge curve for $V_{ref}$ in FIG. 6 becomes steeper is from the time t2 onwards. If the high-frequency voltage $U_{HF}$ now changes level from "low" to "high", the capacitors C1 and C2 in the charging circuits are charged again and, as shown in FIG. 8, a point of intersection S' is produced between the curve $V_{ref}$ and $V_{siglow}$.

The diode D3 ensures that in each case there is only a voltage difference corresponding to the voltage drop across this diode D3 between V1 and V2. Hence, the voltage is carried in parallel on the two node points, even with large modulation swings, such as ASK 100, where the amplitude of the high-frequency input voltage comes close to 0 volts for the "low" level. This ensures, even with these large modulation swings, that it is always possible to ascertain an accurate point of intersection between $V_{sighigh}$ and $V_{ref}$.

Figure 5:
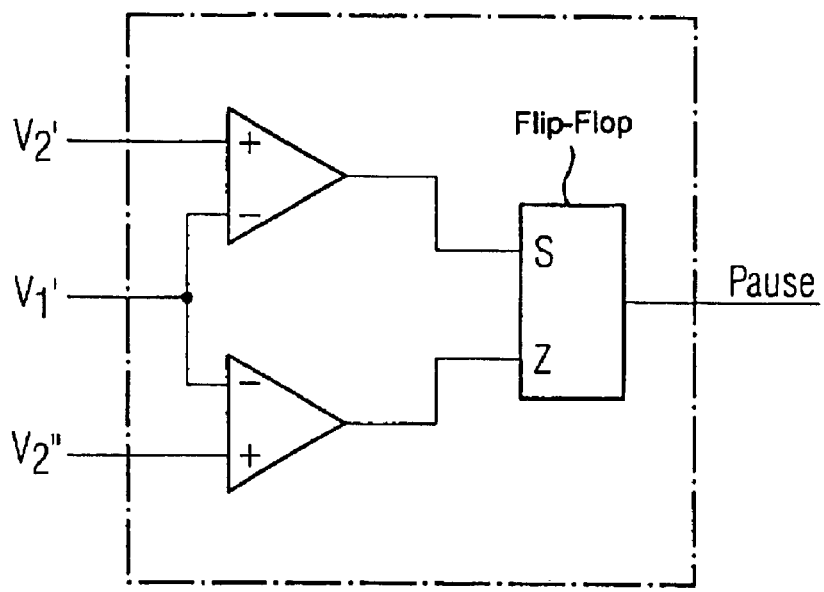
FIG. 5 is a diagram of an example of an evaluation circuit.

FIG. 5 shows one possible evaluation circuit for the signals $V_{ref}$ corresponding to V1', V2' corresponding to $V_{sighigh}$, and V2' corresponding to $V_{siglow}$. In this context, V1' is respectively applied to the negative input of two differential amplifiers, and $V_{sighigh}$ and $V_{siglow}$ are respectively applied to the positive input. The outputs of the differential amplifiers, in turn, are connected to an RS flipflop, as shown. The output of the RS flipflop then outputs a signal corresponding to a "high" level or to a "low" level. Other evaluation circuits are also conceivable, however.

Figure 7:
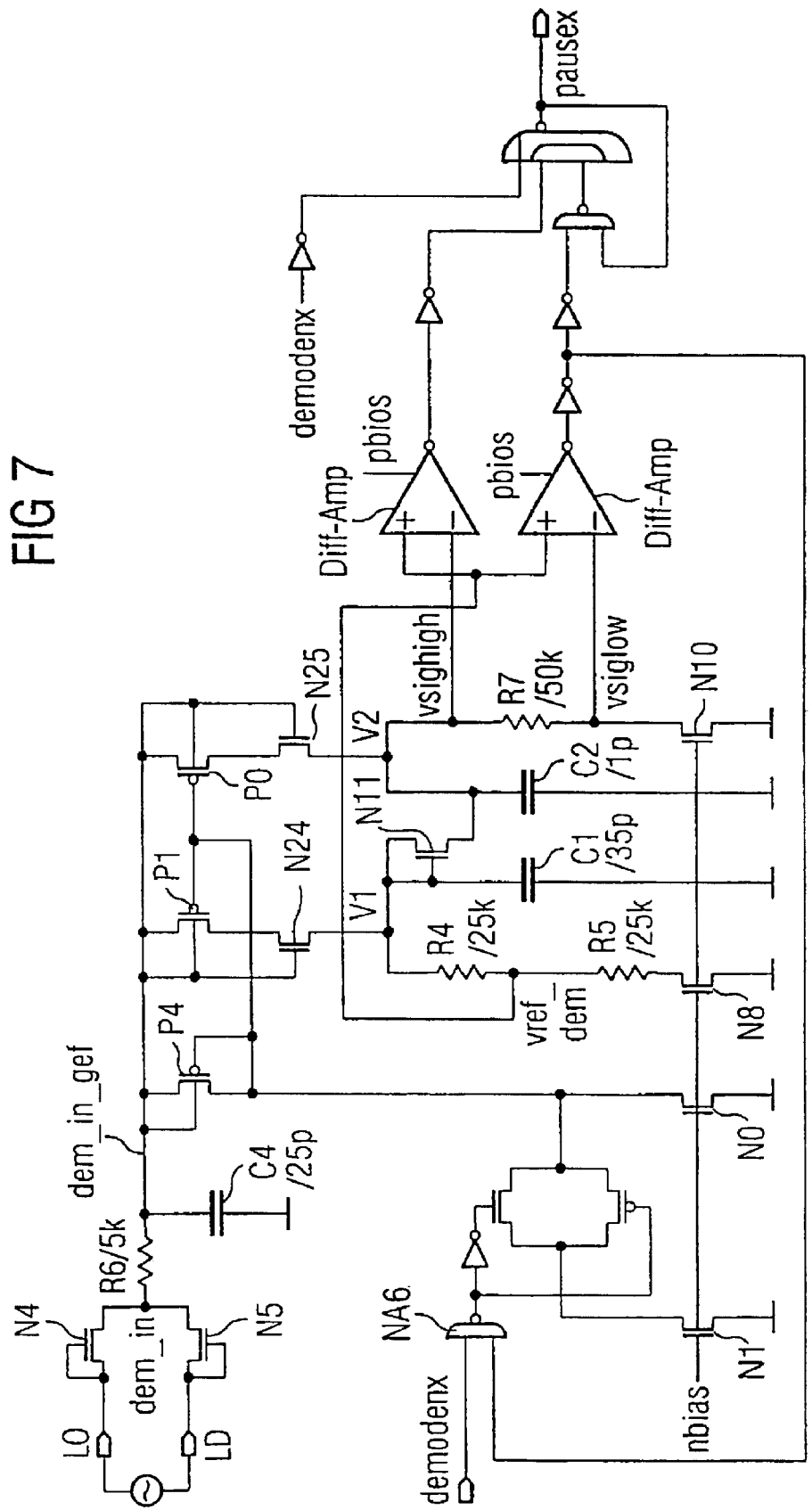
FIG. 7 is a diagram of a circuit that implements the invention.

FIG. 7 shows the implementation of the invention in circuitry using customary CMOS technology. In this case, the input AC voltage is also applied to the input connections LO and LD. In this technology, the diodes D1 to D2 in the preceding exemplary embodiments are formed using transistors N4 and N5.

There is a low-pass input filter (R6, C4) for suppressing the carrier frequency, which is connected to the rectifier circuit.

In contrast to the charging circuit in the preceding exemplary embodiments, a floating current-mirror circuit including the p-channel transistors P1 and P0 is provided. This current-mirror circuit charges the capacitors C1 and C2, to which the current sinks including the n-channel transistors N8 and N10 are connected. The ratio of the charging current delivered by the current-mirror circuit to the discharge current determines the respective charging time constant of the capacitors C1 and C2. The resistors R4, R5 and R7 realize the voltage dividers already explained in connection with the preceding exemplary embodiments. These voltage dividers deliver the signals $V_{ref\_dem}$, $V_{sighigh}$ and $V_{siglow}$ supplied to the window circuit.

The diodes N24 and N25 decouple the voltages V1 and V2 as soon as the input voltage drops below the voltage level of V1 or V2.

The diode N11 has the same function as the diode D3 explained previously.

As an addition to the earlier exemplary embodiments, when a high degree of modulation is identified on the output signal pausex, a corresponding control signal demodenx is supplied on the gate NA6. This control signal operates the two parallel current sinks N1 and N0 connected in series with the current mirror P4. The current mirror P4 is in turn connected in parallel with the current-mirror circuits P1 and P0, as a result of which the charging current of the capacitors is increased by a multiple. This ensures an unreduced detection bandwidth, since the steady state is restored in accelerated fashion even in the case of modulation with a large swing.

The signals $V_{refdem}$, $V_{sigigh}$ and $V_{siglow}$ are otherwise evaluated in a similar manner to that in the preceding exemplary embodiments.

The design variables for the circuit can be taken directly from the circuit.

In general, the invention is not restricted to the exemplary design, however.

We claim:

1. A circuit configuration for demodulating a modulated voltage having an amplitude alternating between a low level and a high level, the circuit configuration comprising:
   a high-frequency input;
   a rectifier circuit connected downstream of said high-frequency input, said rectifier circuit having an output, said rectifier circuit for obtaining an input voltage;
   a first charging circuit for producing a charging voltage;
   a second charging circuit for producing a charging voltage, said first charging circuit and said second charging circuit connected in parallel to said output of said rectifier circuit;
   a decoupling device for decoupling the charging voltage of said first charging circuit and the charging voltage of said second charging circuit when there is a prescribed ratio between the charging voltage of said first charging circuit or the charging voltage of said second charging circuit and the input voltage for said rectifier circuit; and
   an evaluation circuit for ascertaining a modulation level from the ratio of the charging voltages.

2. The circuit configuration according to claim 1, further comprising a floating current-mirror circuit for said first charging circuit and said second charging circuit.

3. The circuit configuration according to claim 1, further comprising a voltage transformer for changing the charging voltage of said first charging circuit and/or the charging voltage of said second charging circuit.

4. The circuit configuration according to claim 1, further comprising a diode for coupling said first charging circuit and said second charging circuit when there is a predetermined ratio between the charging voltage of said first charging circuit and the charging voltage of said second charging circuit.

5. The circuit configuration according to claim 1, wherein a voltage on said second charging circuit is converted into two different voltages.

6. The circuit configuration according to claim 1, wherein said first charging circuit and said second charging circuit have different discharge times.

7. The circuit configuration according to claim 1, further comprising:
   a charging-current amplification circuit; and
   a changeover apparatus for turning on said charging-current amplification circuit from a prescribed degree of modulation onwards.

* * * * *